United States Patent [19]

Kinoshita et al.

[11] Patent Number: 5,276,668
[45] Date of Patent: Jan. 4, 1994

[54] COMPACT DISK SELECTING MECHANISM INCLUDING MECHANICAL AND OPTICAL DETECTION

[75] Inventors: Shigeo Kinoshita; Shigeru Tsuda; Takahiro Asano; Sadamu Matsuda, all of Tokyo, Japan

[73] Assignee: Clarion Co., Ltd., Tokyo, Japan

[21] Appl. No.: 645,238

[22] Filed: Jan. 24, 1991

[30] Foreign Application Priority Data

Feb. 2, 1990 [JP] Japan ................................ 2-24981
Aug. 21, 1990 [JP] Japan .............................. 2-87808[U]

[51] Int. Cl.$^5$ ............... G11B 33/02; G11B 17/028; G11B 17/10
[52] U.S. Cl. .................... 369/75.2; 369/178
[58] Field of Search ............. 369/34, 75.2, 178, 191, 369/202, 36

[56] References Cited

U.S. PATENT DOCUMENTS

| | | | |
|---|---|---|---|
| 4,589,101 | 5/1986 | Schatteman | 369/36 |
| 4,592,039 | 5/1986 | Toyoguchi | 369/75.2 |
| 4,759,008 | 7/1988 | Hirano | 369/75.2 |
| 4,809,252 | 2/1989 | Ikedo | 369/34 |
| 4,841,499 | 6/1989 | Takahasi | 369/36 |
| 4,845,700 | 7/1989 | Koizumi | 369/75.2 |
| 4,949,324 | 8/1990 | Arata | 369/38 |
| 4,949,328 | 8/1990 | Kase | 369/75.2 |
| 5,034,935 | 7/1991 | Ishibashi et al. | 369/36 |
| 5,099,466 | 3/1992 | Kimura et al. | 369/36 |

*Primary Examiner*—Eugene R. LaRoche
*Assistant Examiner*—Michael C. Kessell
*Attorney, Agent, or Firm*—Flynn, Thiel, Boutell & Tanis

[57] ABSTRACT

A disk selecting mechanism is disclosed, in which a slide plate is moved forward and backward by driving a slide link by means of a driving gear and a disk conveying portion is moved according thereto in the up and downward direction by a stepwise cam portion disposed on the slide link so as to set it at an arbitrary position in the up and downward direction, in order to select an arbitrary disk from a magazine.

1 Claim, 26 Drawing Sheets

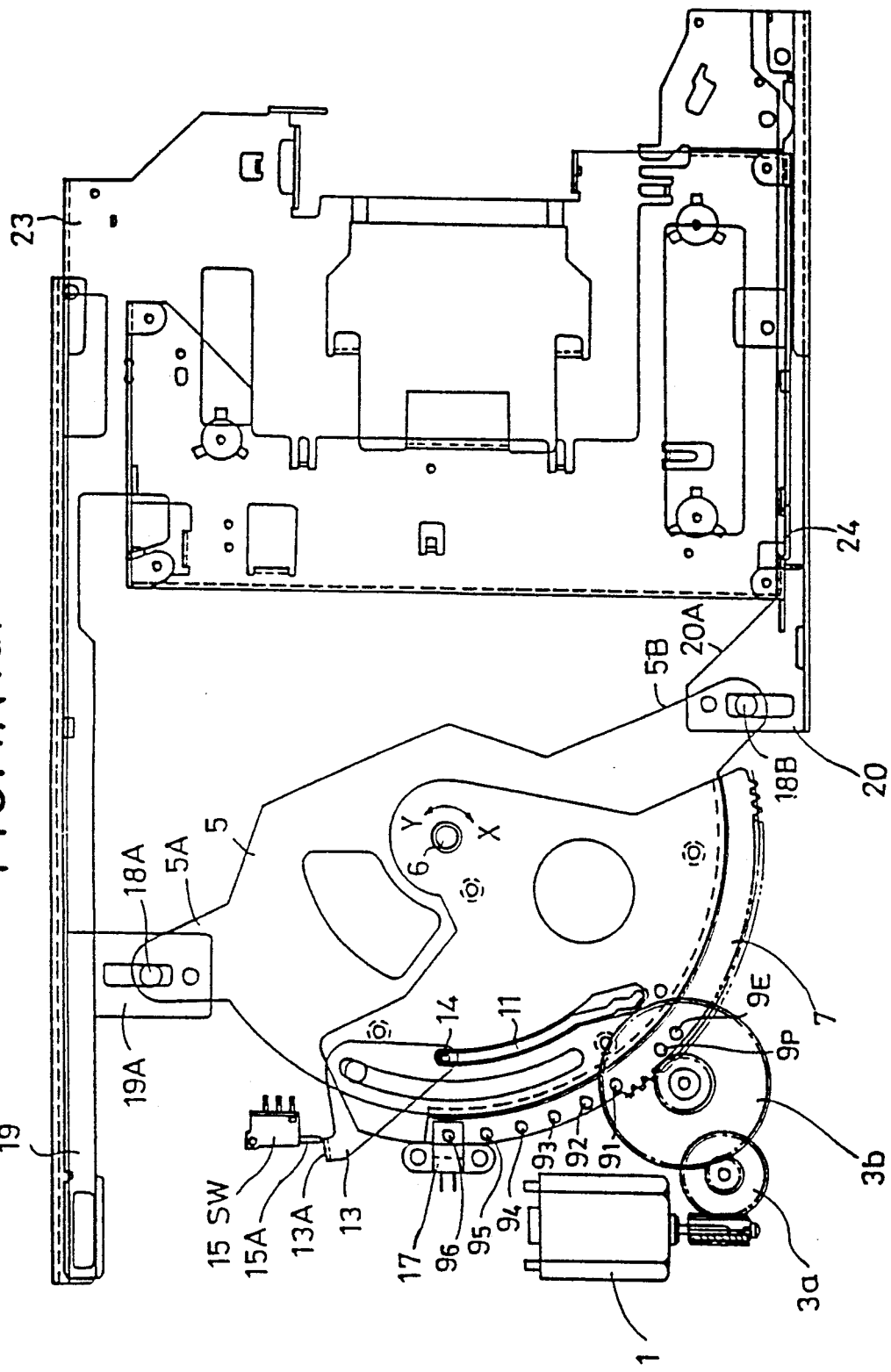

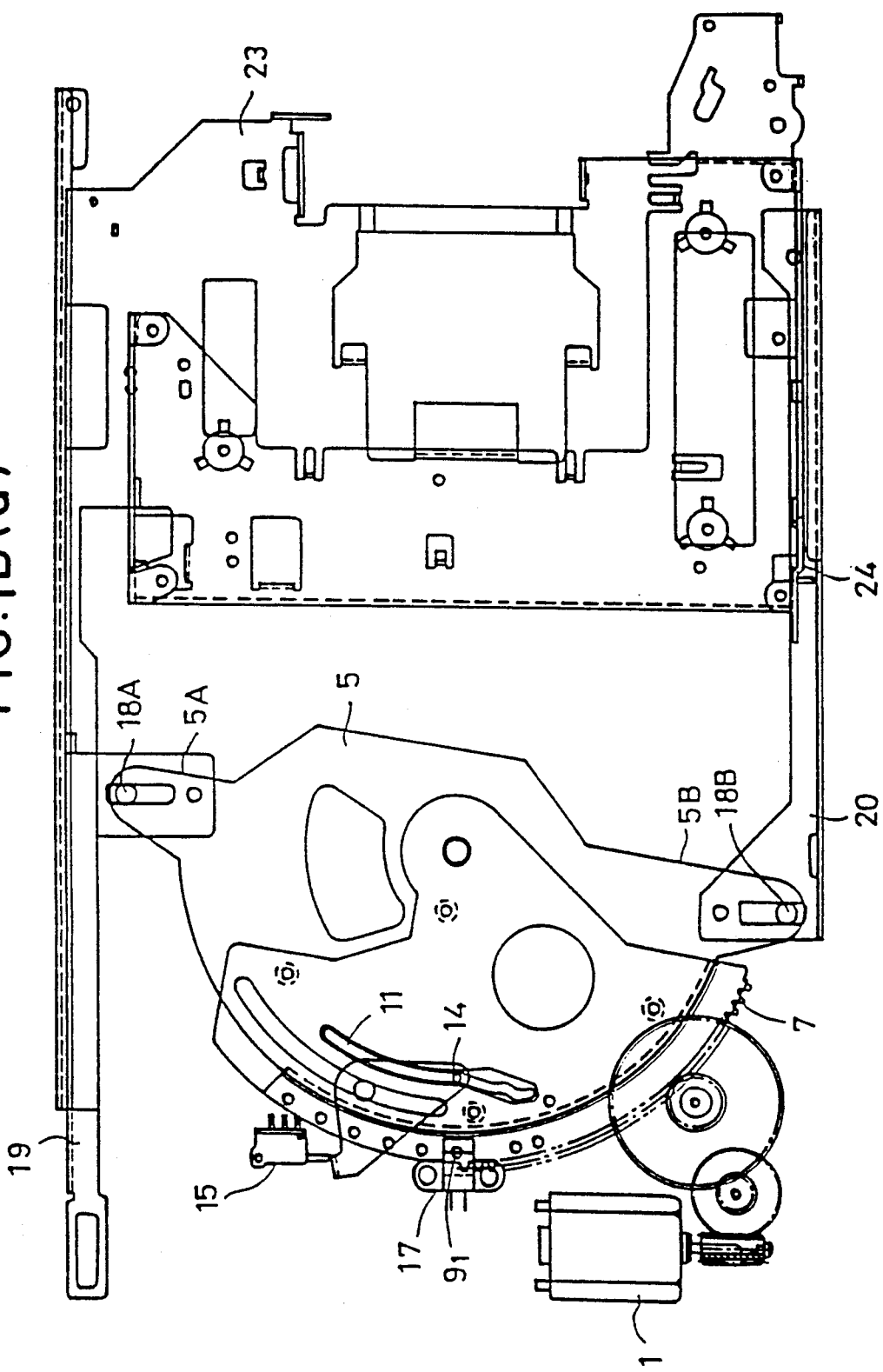

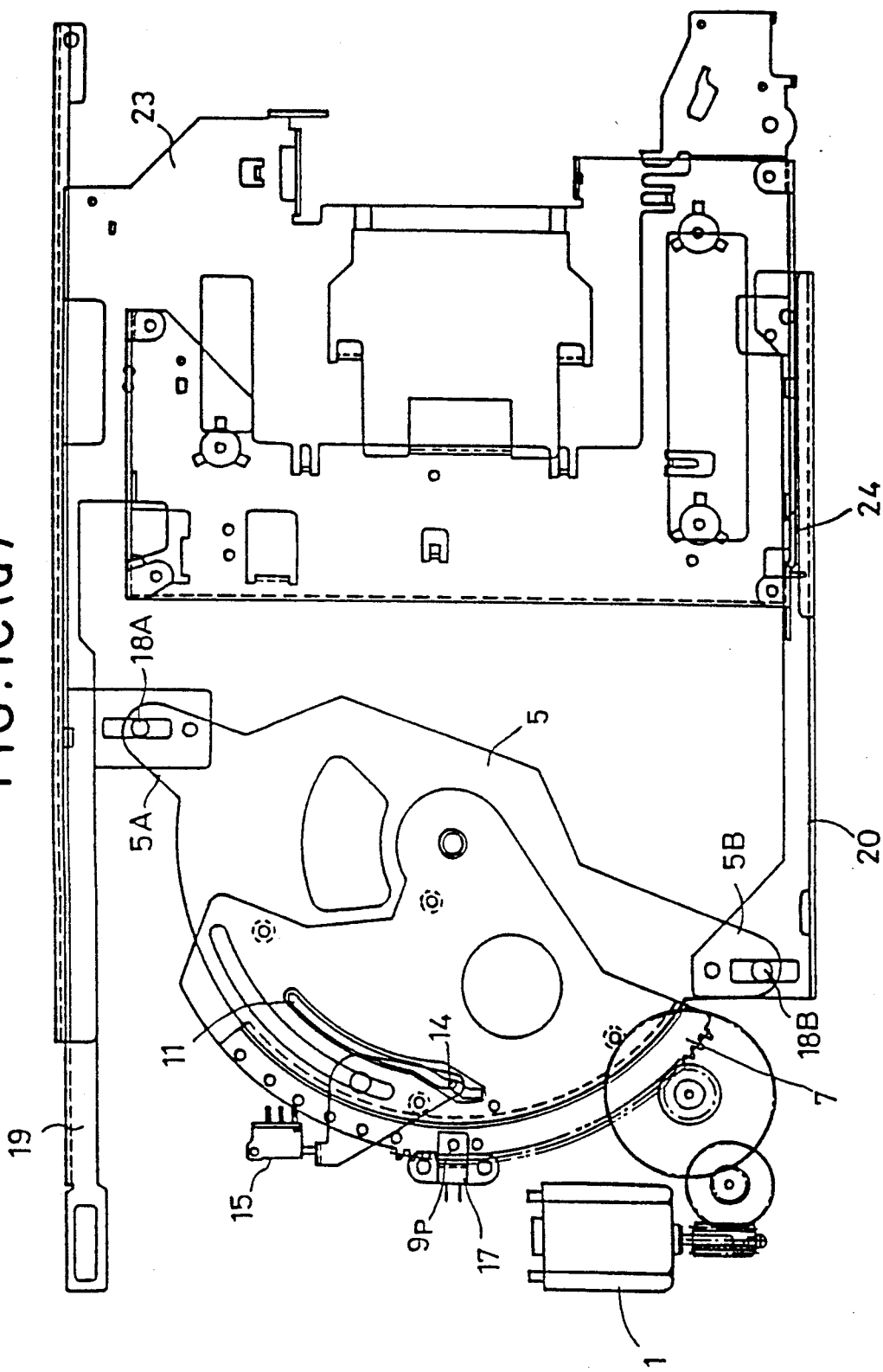

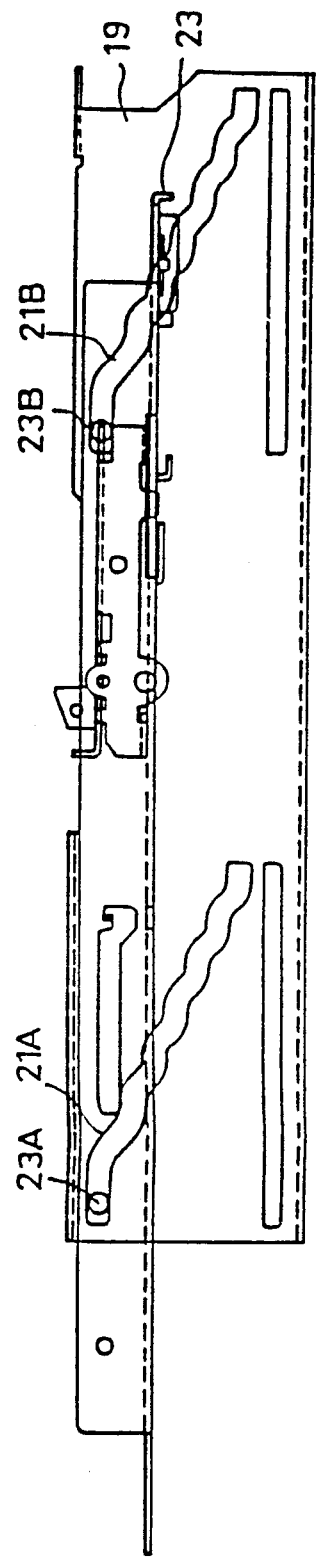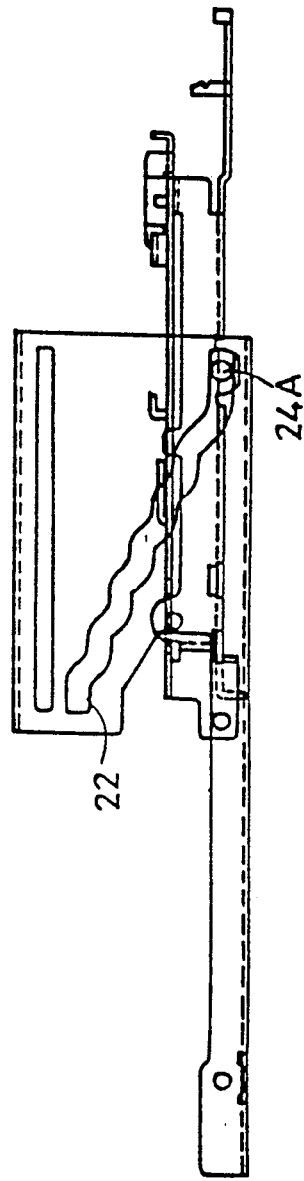

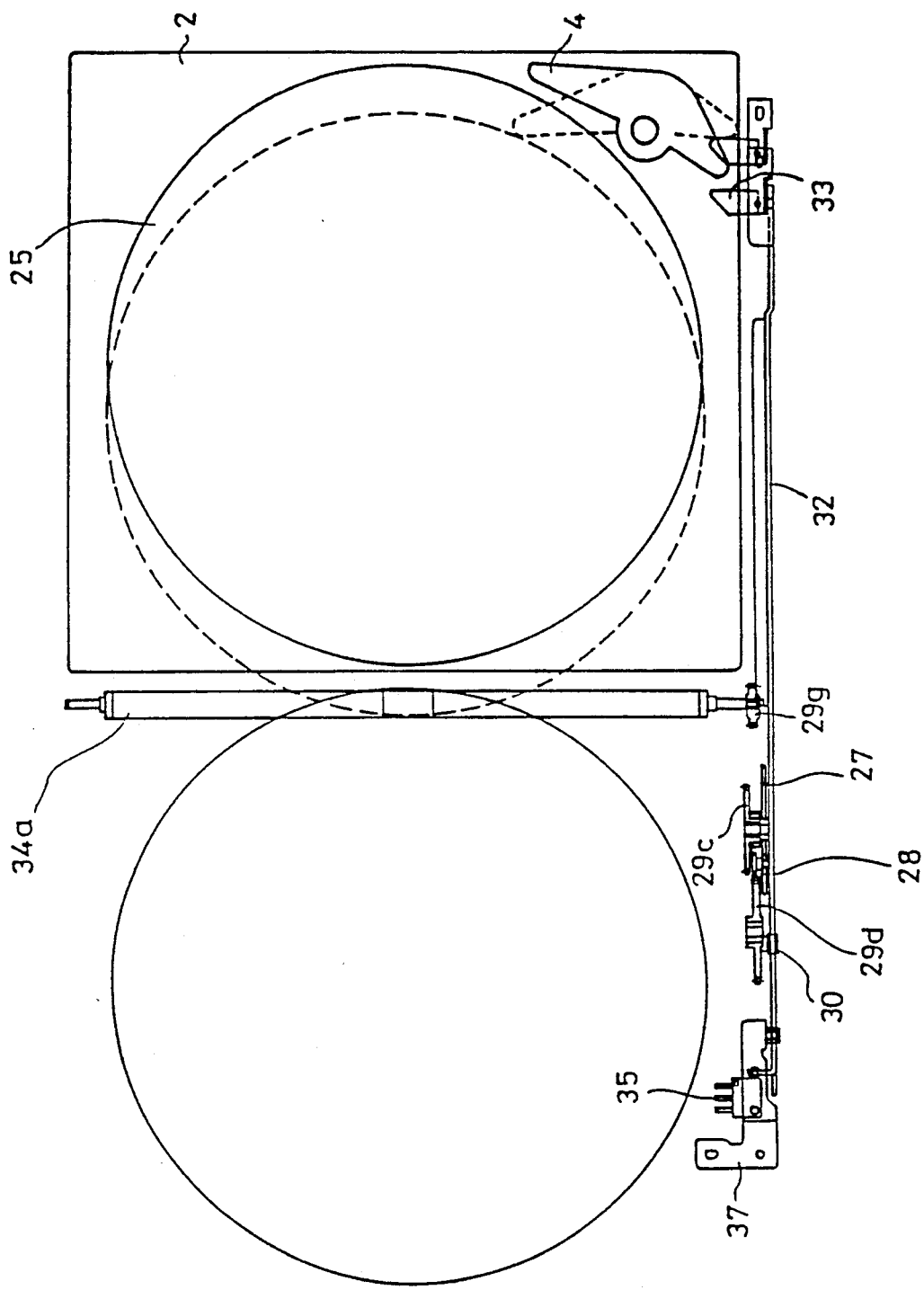

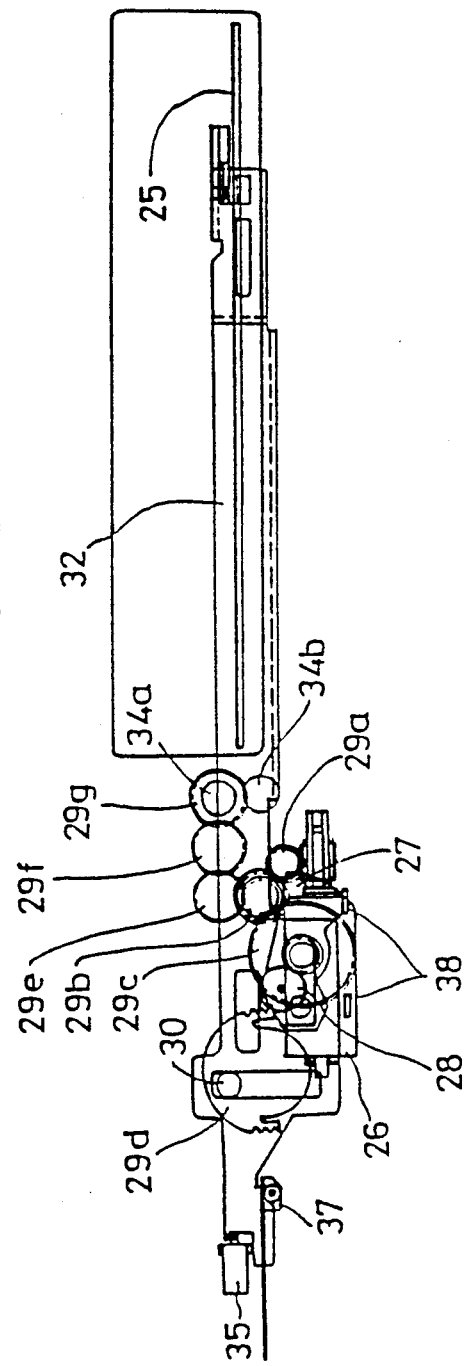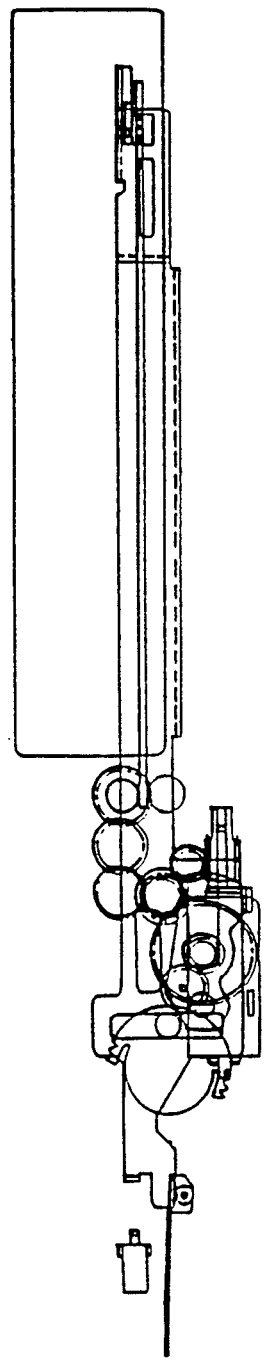

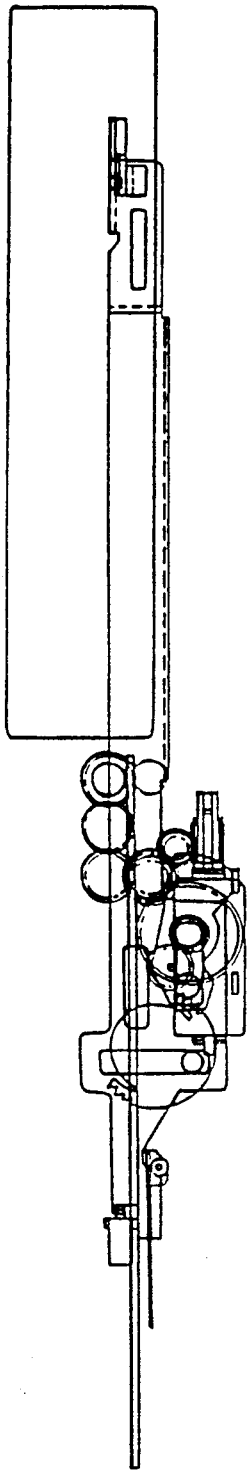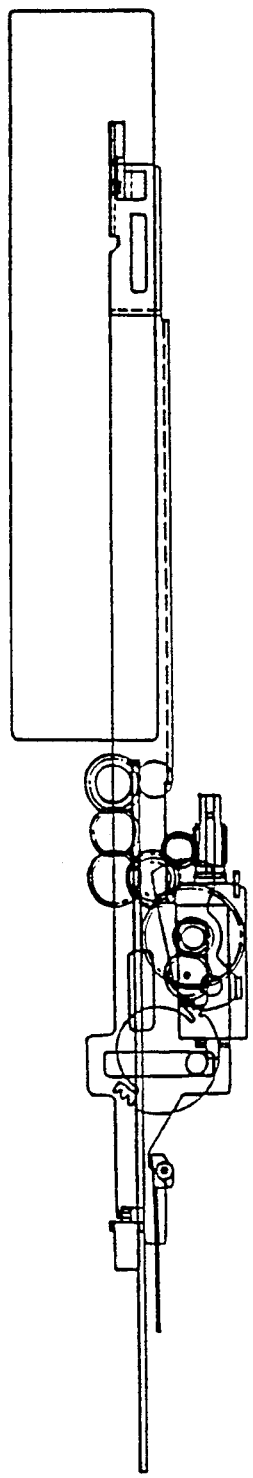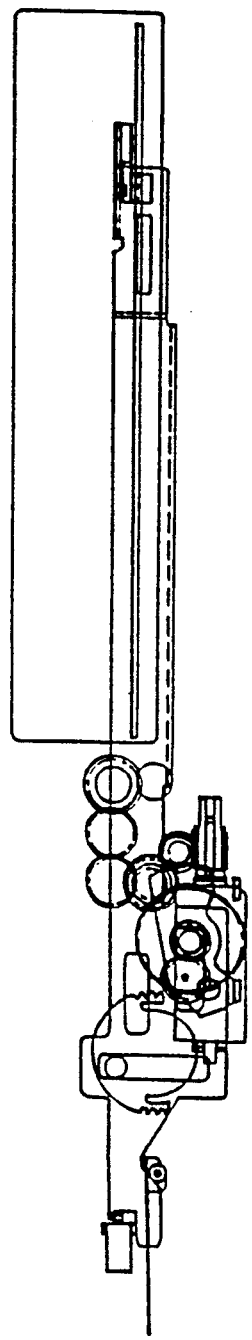

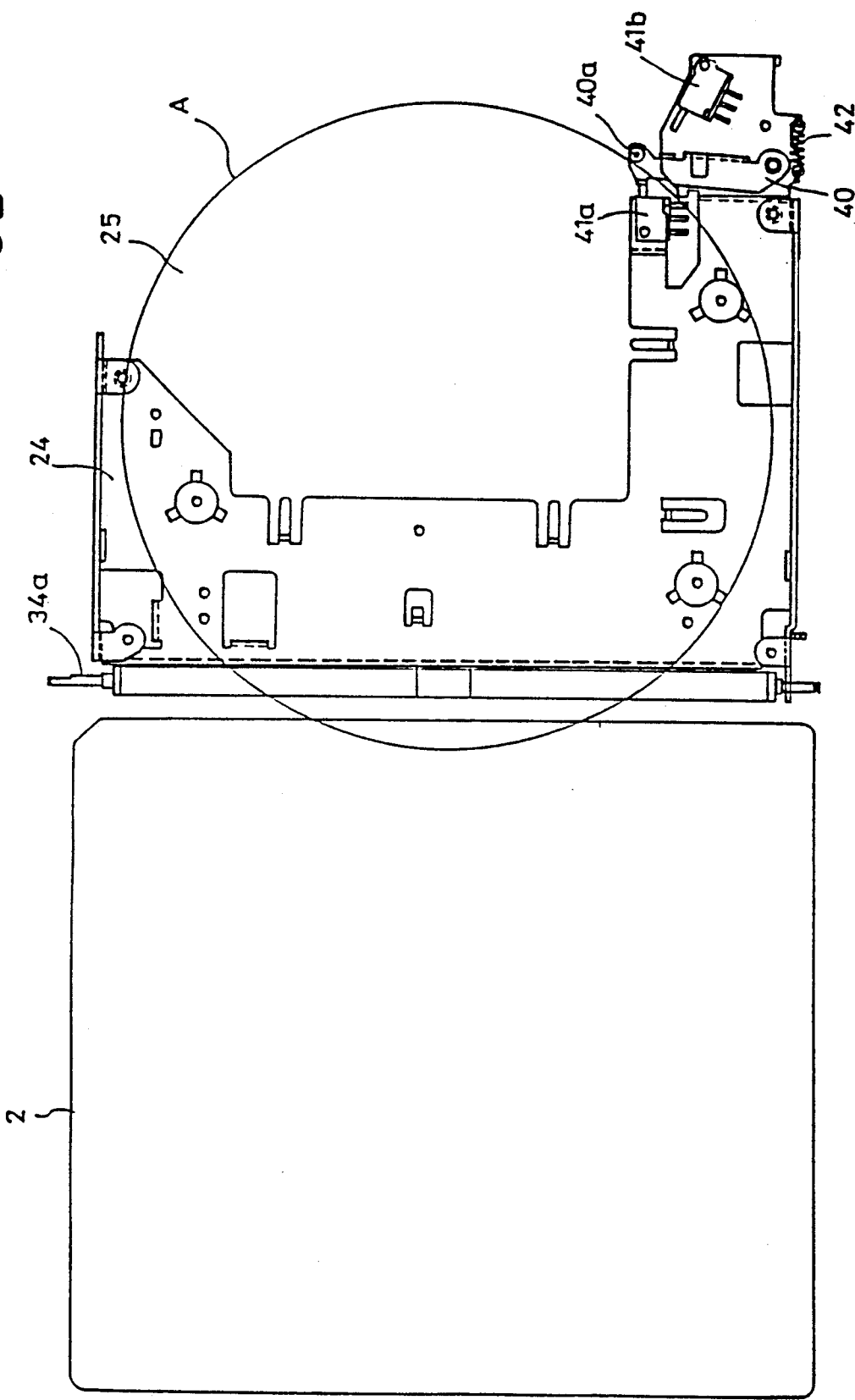

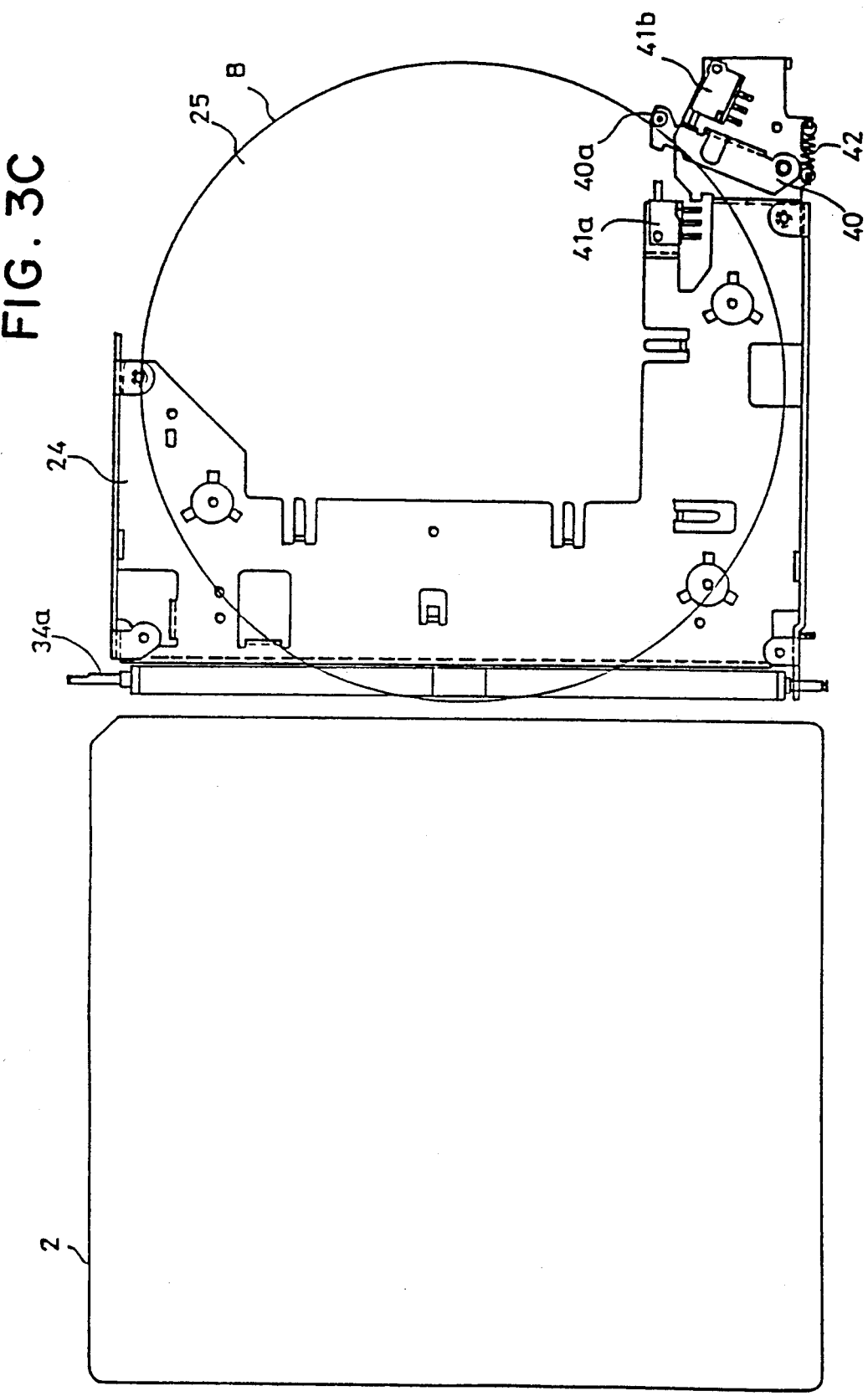

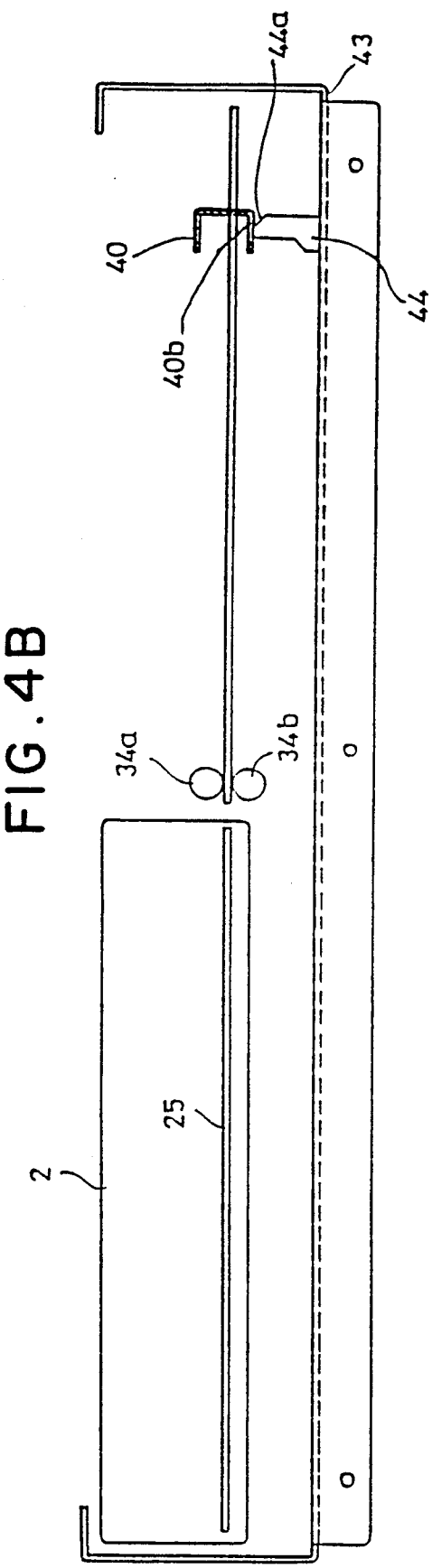
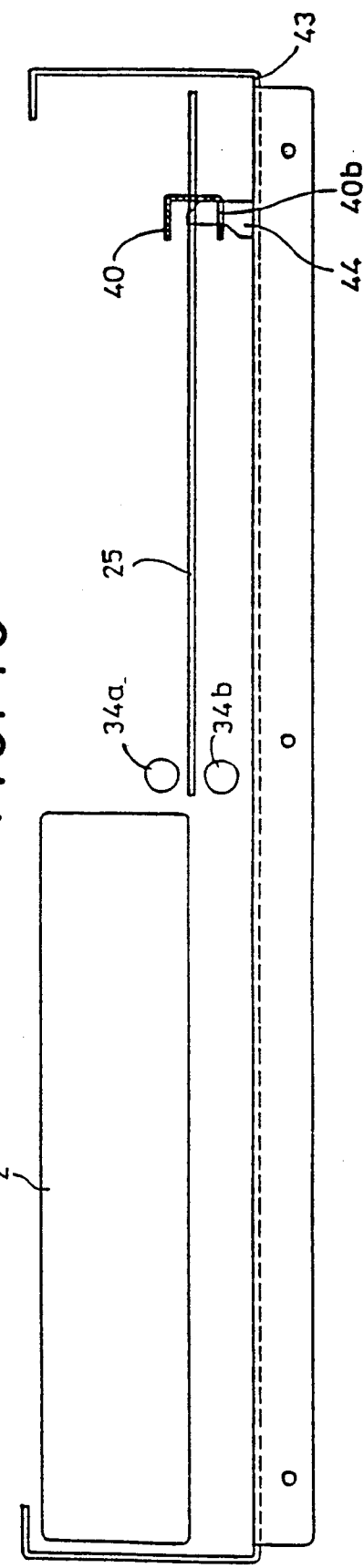

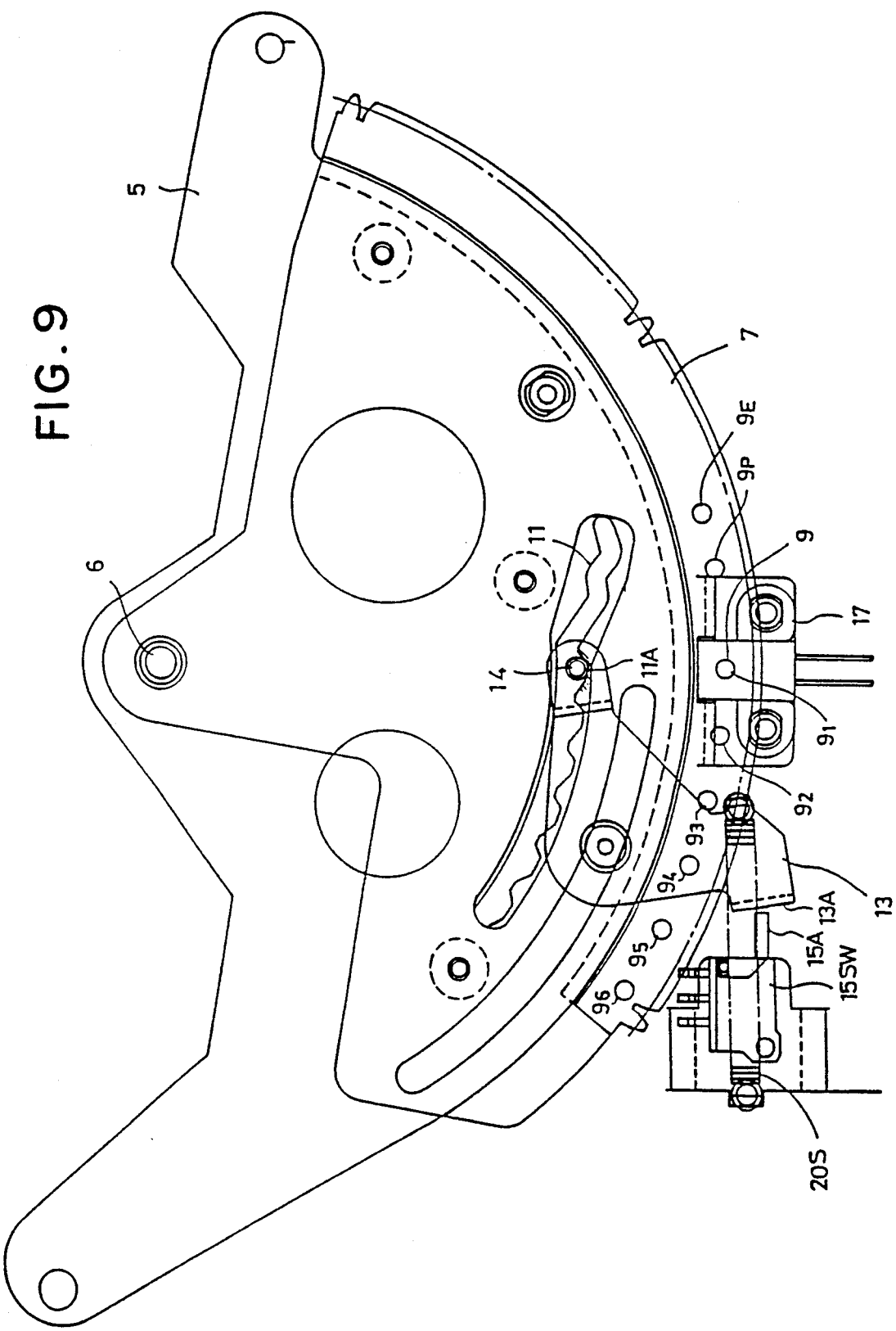

COMPACT DISK SELECTING MECHANISM INCLUDING MECHANICAL AND OPTICAL DETECTION

FIELD OF THE INVENTION

The present invention relates to a compact disk (hereinbelow abbreviated to CD) selecting mechanism applied to a CD player for car use, etc.

BACKGROUND OF THE INVENTION

Since CD players for car use have been developed because CDs are widely utilized, it becomes possible to enjoy music of high quality during driving. For such a CD player for car use, in order to alleviate the inattention given to the driving operation by exchanging CDs often, there is a tendency of adopting a so-called autochanger system, which is constructed such that a desired piece of music can be easily selected by setting a plurality of CDs together in a magazine and loading this magazine into a player. FIGS. 8A, 8B and 8C show the construction of a magazine 2 used in such an autochanger system. In the inner space of a box-shaped magazine, 2 there are disposed a plurality of e.g. 5 spacers with a certain interval. Owing to these spacers a plurality of CDs, in this case 6 CDs can be accommodated. The spacers 8 are made of a material having a soft surface selected so as not to damage the CDs.

In the case where the player is loaded with a magazine, in which a plurality of CDs are set as described above, a CD selecting mechanism is required which selects an arbitrary CD, taken it out from the magazine and moves it to a play position.

Heretofore such a selecting mechanism is constructed by a lead screw system utilizing a lead screw.

However the prior art CD selecting mechanism using the lead screw system has several problems as described below.

1. The precision of the selected position is low, in the case where a CD is selected from the magazine.
2. The selecting operation is slow, because the lead screw is used.
3. The mounting efficiency is low, because a high precision is required for positioning parts, when they are mounted in the player.

OBJECT OF THE INVENTION

The present invention has been done in order to deal with the problems as described above and the object thereof is to provide a CD selecting mechanism capable of solving these problems of the prior art technique.

SUMMARY OF THE INVENTION

In order to achieve the above object, a first invention of the present application is characterized in that it comprises a driving gear, which can be rotated both in the forward and in the backward direction; a slide link, with which a slide gear engaged with the driving gear is disposed together in one body; a slide plate having a stepwise cam portion, which is moved by the slide link; and a disk conveying portion engaged with the stepwise cam portion of the slide plate, which can be moved up and downward.

A second invention of the present application is characterized in that it comprises a driving gear, which can be rotated both in the forward and in the backward direction; a slide link, with which a slide gear engaged with the driving gear is disposed together in one body, and in which there are disposed a plurality of position detecting holes and a groove cam along the slide gear; a switch operated by the groove cam stated above; a slide plate having a stepwise cam portion, which is moved by the slide link; and a disk conveying portion engaged with the stepwise cam portion of the slide plate, which can be moved up and downward.

The slide plate effects forward and backward movement on a straight line by driving the slide link by means of the driving gear. Since the disk conveying portion effects the up and downward movement owing to the stepwise cam portion, depending on this forward and backward movement, it is possible to position the disk conveying portion at an arbitrary position in the upward and downward direction. In this way it is possible to select an arbitrary CD from the magazine.

Further the position of the disk conveying portion in the upward and downward direction is detected by the position detecting holes and furthermore it is possible to detect the position of the disk conveying portion in the upward and downward direction by means of the switch with a high precision.

BRIEF DESCRIPTION OF THE DRAWINGS

FIGS. 2A and 2B to 2C are a top view and side views, respectively, showing a CD conveying mechanism incorporated in a CD player for car use;

FIGS. 3A to 3C are top views of a CD conveying speed switching mechanism incorporated in the CD player for car use;

FIGS. 4A, 4B and 4C are a top view and side views, respectively, showing a CD conveyance termination detecting mechanism incorporated in the CD player for car use;

FIG. 9 is a plan view of a CD selecting mechanism, which is another embodiment of the present invention.

DETAILED DESCRIPTION

Figure 1A:
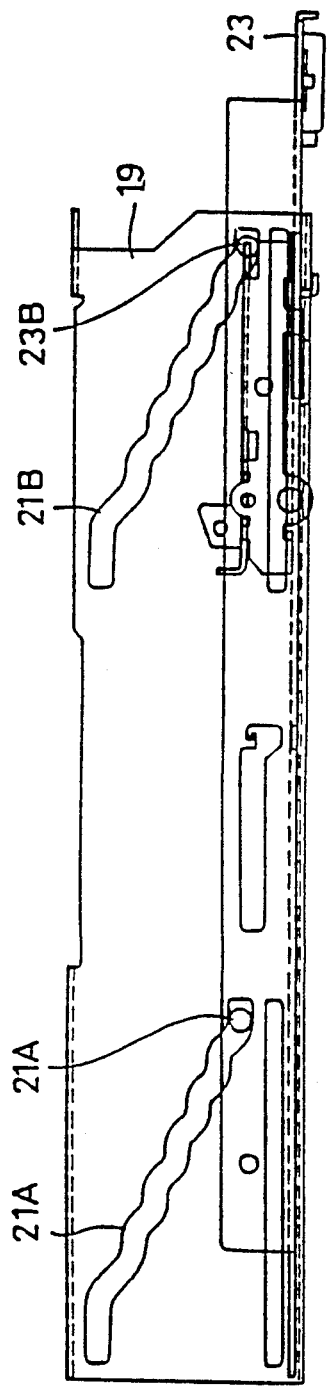
FIGS. 1A(a), and 1A(b), 1A(c) to FIGS. 1D(a) and 1D(b), 1D(c) are plan views and side views, respectively, showing an embodiment of the CD selecting mechanism according to the present invention.
Figure 1A:
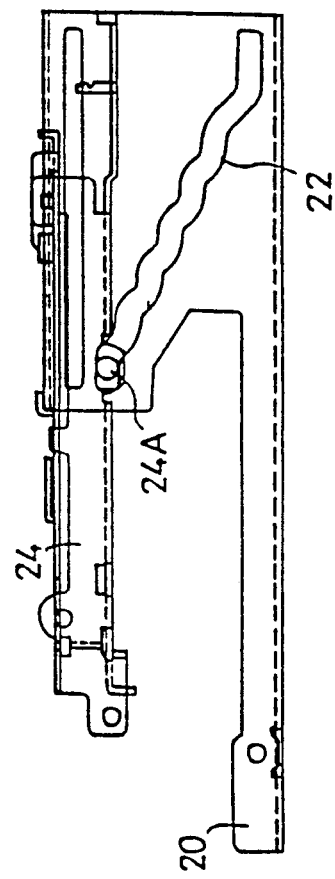

Hereinbelow an embodiment of the present invention will be explained, referring to the drawings.

Figure 8A:
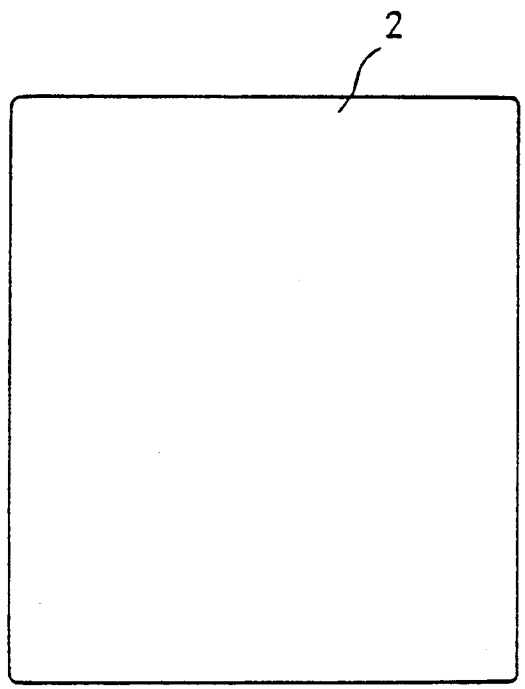
FIGS. 8A, 8B and 8C are a top view, a side view and a back view, respectively, showing a magazine incorporated in the CD player for car use.
Figure 8B:
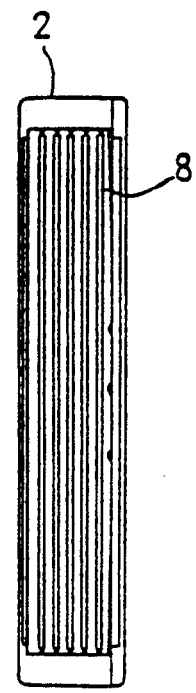
Figure 8C:
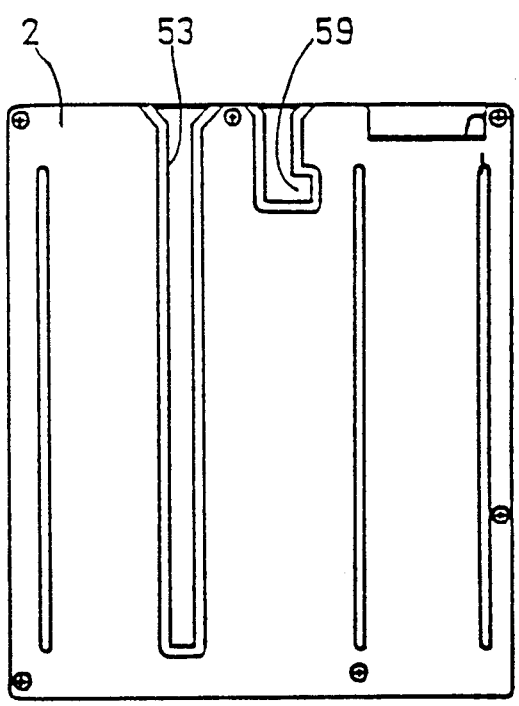

FIGS. 1A(a), 1A(b) and 1A(c) to FIGS. 8A, 8B and 8C show the construction of a CD player for car use, to which the present invention is applied. Hereinbelow the whole construction will be explained for every principal mechanism.

(1) CD Selecting Mechanism

Figure 1B:
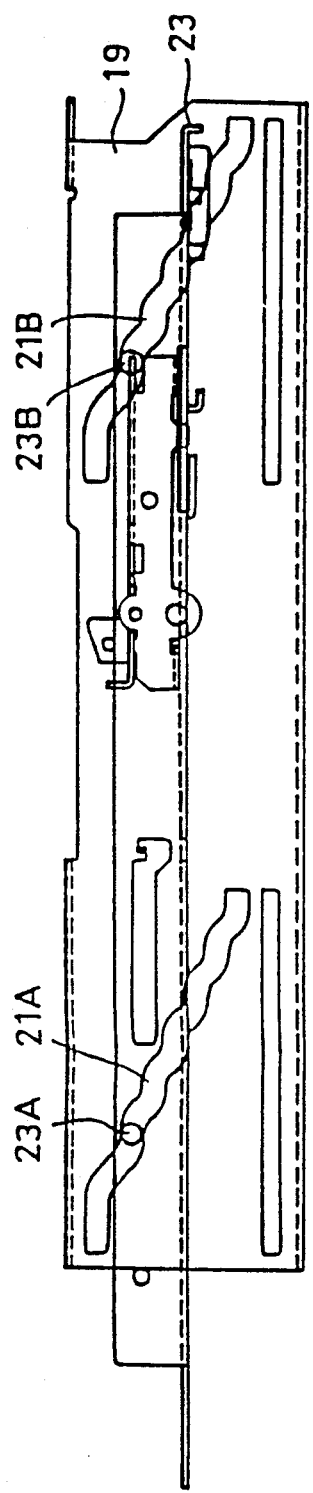
Figure 1B:
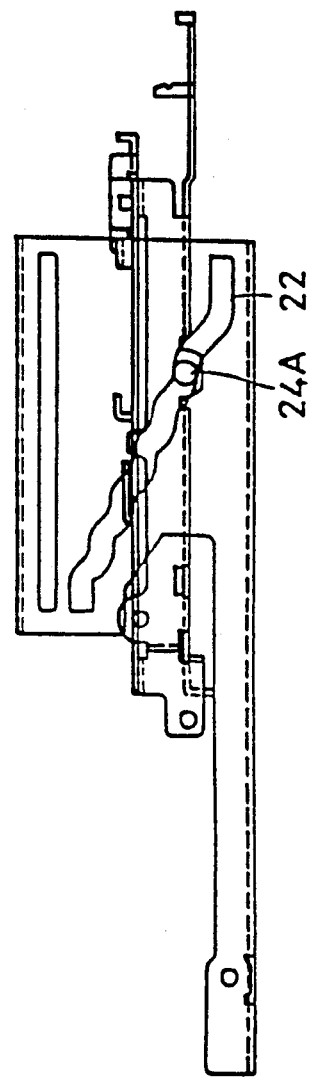
Figure 1C:
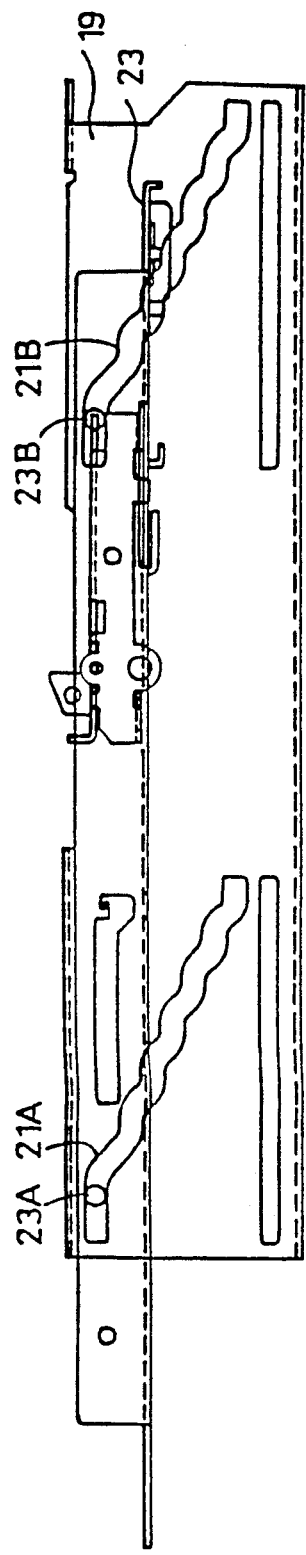
Figure 1C:
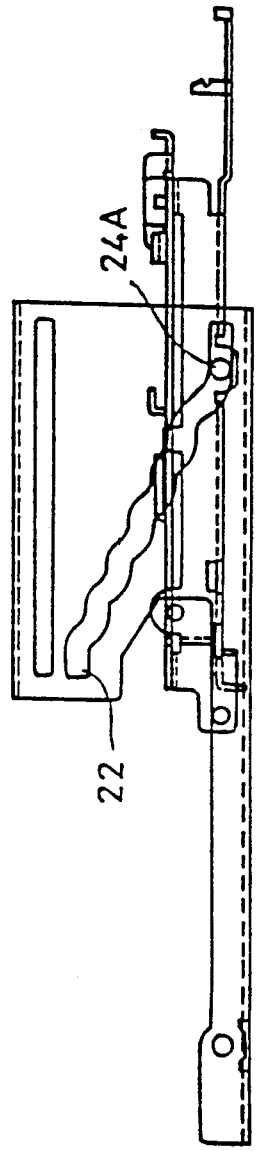
Figure 1D:
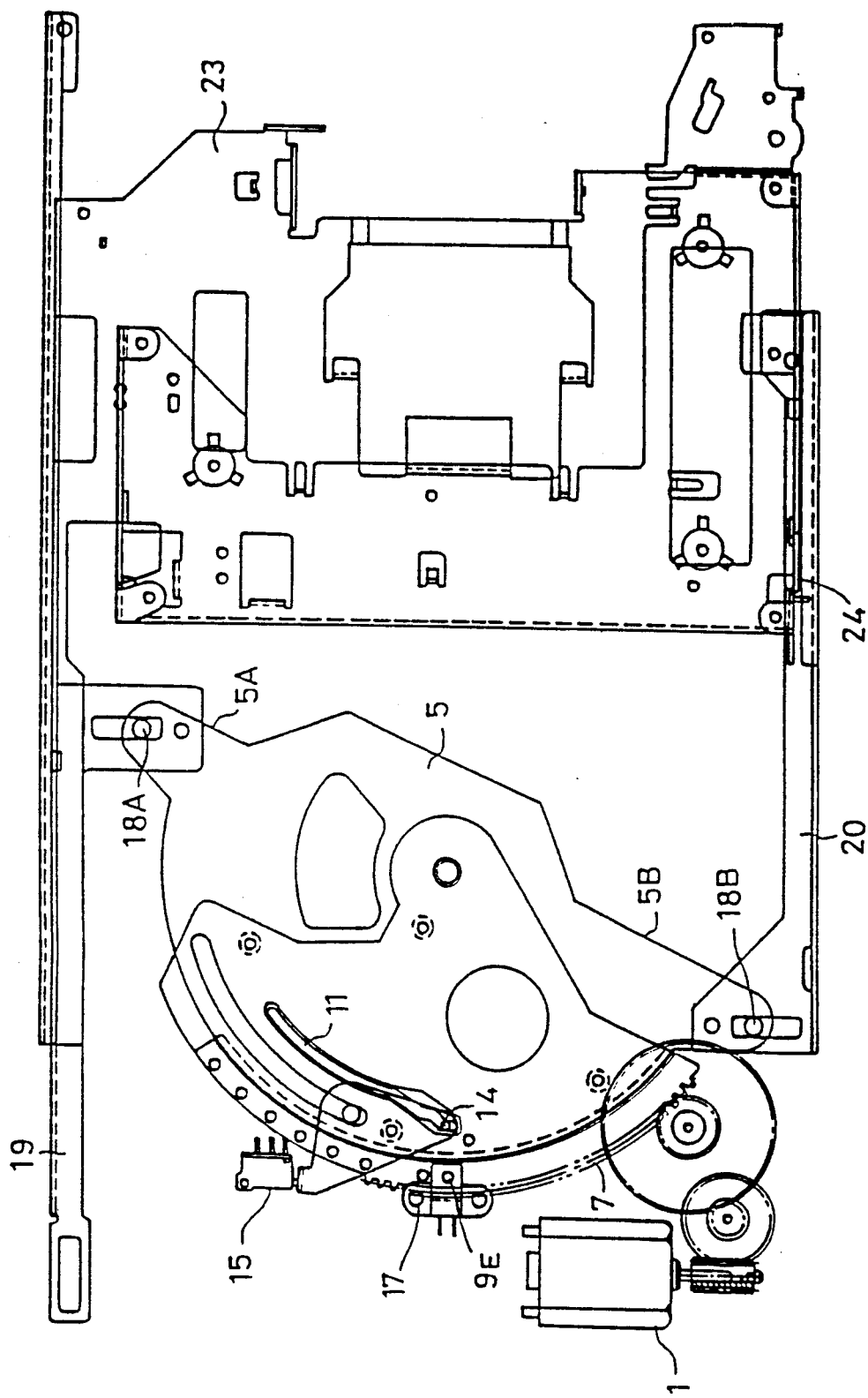

FIGS. 1A(a) to 1A(c) to FIGS. 1D(a) to 1D(c) show a CD selecting mechanism, in which reference numeral 1 is a motor, which can be rotated both in the forward and in the backward direction, and whose rotating force is transmitted to a slide gear 7 mounted on a slide link 5 in one body therewith through a gear A 3a and a gear B 3b. The slide link 5 can be rotated both in the clockwise direction X and in the counterclockwise direction Y around a fixed axle 6. A plurality of position detecting holes 9 and a cam groove 11 are formed along the periphery of the slide gear 7. Presuming that e.g. 6 CDs are set in a magazine, there are disposed 8 position detecting holes 9 in total, i.e. 6 holes $9_1$ to $9_6$ corresponding to the CD positions, a hole $9_P$ corresponding to the PLAY position and a hole $9_E$ corresponding to the EJECT position.

13 is a switch plate, which is engaged with the cam groove 11 through an axle 14 and the extremity portion 13A of which is brought into contact with a thrusting piece 15A of a switch 15. Thus switch 15 detects either one of the position detecting holes 9 described above, which is specified, depending on the thrusting state of the thrusting piece 15A. Further there is disposed a photointerrupter 17 detecting the position detecting holes 9 formed in the slide gear 7 on the upper and the lower side. In this way a specified one of the position detecting holes 9 is detected by these elements, the switch 15 and the photointerrupter 17.

The two extremity portions 5A and 5B of the slide link 5 are engaged with the extremity portions 19A and 20A of a first slide plate 19 and a second slide plate 20, respectively. On the first slide plate 19 there are disposed stepwise cams 21A and 21B and on the other hand there is disposed a stepwise cam 22. For the first slide plate 19 the lower side thereof in the figure is the upper side in reality and to the contrary, for the second slide plate 20, the upper side thereof in the figure indicates the upper side in reality. 23 is an upper plate and 24 is a lower plate. These are constructed so as to be one body, which constitutes a CD conveying mechanism. The upper plate 23 is engaged with the stepwise cams 21A and 21B through axles 23A and 23B and on the other hand the lower plate 24 is engaged with the stepwise cam 22 through an axle 24A.

Owing to such a construction, when the slide link 5 is rotated in the clockwise direction X, the first slide plate 19 is moved horizontally to the right in the figure and on the contrary the second slide plate 20 is moved horizontally to the left in the figure. As described above, when the slide link 5 is rotated, the upper plate 23 is lowered through the axles 23A and 23B by the action of the stepwise cams 21A and 21B on the first slide plate 19 and the lower plate 24 is lowered also through the axle 24A by the action of the stepwise cam 22 on the second slide plate 20. On the other hand, when the slide link 5 is rotated in the counterclockwise direction Y, the first slide plate 19 is moved horizontally to the left and at the same time the second slide plate 20 is moved horizontally to the right. Consequently, when the slide link 5 is rotated in this direction, contrarily to the case described previously, the upper plate 23 and the lower plate 24 are raised. In this way it is possible to move intermittently the CD conveying mechanism consisting of the upper plate 23 and the lower plate 24 in the upward and downward direction owing to the action of the stepwise cams 21A, 21B and 22 by rotating the slide link 5 in the clockwise direction X or in the counterclockwise direction Y by rotating the motor 1 forward or backward.

When the slide link 5 is rotated in the counter clockwise direction Y so that the upper plate 23 and the lower plate 24 are raised to the highest position, as indicated in FIG. 1A, the position detecting hole $9_6$ is detected by the photointerrupter 17. Further, by the fact that the switch 15 detects the thrusting state of the thrusting piece 15A by the extremity portion 13A of the switch plate 13, it is detected that the mechanism is at the position of the sixth CD.

When the upper plate 23 and the lower plate 24 are at the position corresponding to the position detecting hole $9_1$, as indicated in FIG. 1B, it is detected that the mechanism is at the position of the first CD.

When the upper plate 23 and the lower plate 24 are at the position corresponding to the position detecting hole $9_P$, as indicated in FIG. 1C, it is detected that the mechanism is at the PLAY position.

When the upper plate 23 and the lower plate 24 are at the position corresponding to the position detecting hole $9_E$, as indicated in FIG. 1D, it is detected that the mechanism is at the EJECT position.

The upper plate 23 and the lower plate 24 can be smoothly moved, when they are intermittently moved, by utilizing cycloid curves for the shape of the stepwise cams 21A, 21B and 22 described above.

(2) CD Conveying Mechanism

FIGS. 2A to 2F show a CD conveying mechanism, in which 26 indicates a motor, which can be rotated both forward and backward and the rotating force of which is transmitted to an idler arm 27, an idler gear 28 and a gear D 29d. A roller 30 disposed on the gear D 29d is rotated by rotating it, and a disk load plate 32 engaged with this roller 30 is moved intermittently in the horizontal direction. At the extremity of the disk load plate 32 there is disposed a disk load lever 33, which is moved, as the disk load plate 32 is moved horizontally to the right in the figure, so that a disk lever 4 disposed in the magazine 2 is rotated from the position indicated by a full line to that indicated by a broken line. In this way a disk (CD) 25 set within the magazine 2 is ejected from the position indicated by a full line to that indicated by a broken line.

On the other hand, the rotating force of the motor 26 is transmitted to a gear G 29g through a gear A 29a, a gear B 29b, a gear C 29c, a gear E 29e and a gear F 29f. A disk roller A 34a is disposed on the gear G 29g. In this way the disk roller A 34a is rotated so as to stick the disk 25 indicated by the broken line together with a disk roller B 34b, which is moved by the disk roller A 34a by friction. The disk 25 is conveyed to the left in the figure by these two rollers A 34a and B 34b. Since the disk roller A 34a and the disk roller B 34b are rotated backward by rotating the motor 26 backward, the disk 25 is moved in the backward direction and set again in the magazine 2. 37 is a spring plate, which is used for holding the gear D 29d acting as an intermittent gear at a constant position. By the fact that a pin mounted on this spring plate is engaged with a cam disposed on a disk load plate 32, an energizing force is given thereto, only when the disk load plate 32 is at a predetermined position. If the energizing force were given always to the disk load plate 32, the disk loading operation would proceed from the beginning of the disk loading to the middle thereof in the figure, but inconveniences would be produced thereafter, because the energizing force would be applied also to the transmitting gears themselves. The parts described above are used in order to prevent this inconvenience. 38 (FIG. 2B) represents a stopper.

FIG. 2B shows the state at the beginning of the disk loading; FIG. 2C the state at the middle of the disk loading; FIG. 2D the state at the termination of the disk loading; FIG. 2E the state at the beginning of the disk unloading; and FIG. 2F the state at the termination of the disk unloading.

(3) CD Conveying Speed Switching Mechanism

Figure 3A:
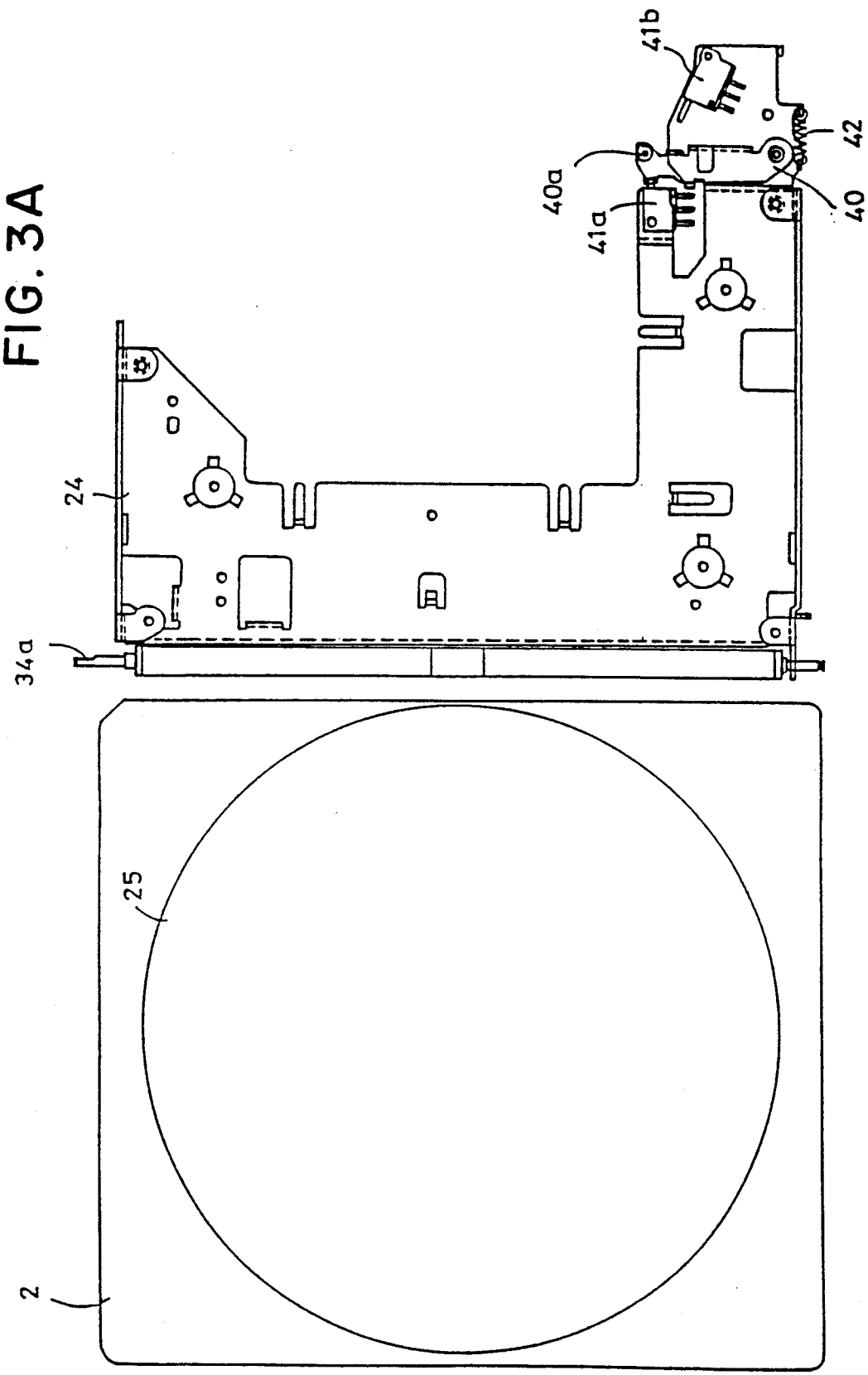

FIGS. 3A to 3C show a CD conveying speed switching mechanism, in which 2 is the magazine, in which the disk 25 is set; 34a is the disk roller; and 24 is the lower plate. 40 is a switch arm, which is rotated by the disk 25 conveyed by the two disk rollers A 34a and B 34b and which has a piston 40a. A switch A 41a and a switch B 41b are disposed on the lower plate 24. They are so constructed that when they are manipulated by the switch arm described above, the voltage applied to the motor driving the disk roller A 34a is lowered so that the disk conveying speed is changed.

When the disk 25 set in the magazine 2 as indicated in FIG. 3A is conveyed to the position A by the disk roller A 34a, as indicated in FIG. 3B, the switch arm 40 is rotated by pushing the pin 40a on the switch arm 40 to turn off the switch A 41a. By the fact that the voltage applied to the motor 26 is lowered in this way, the conveying speed of the disk roller A 34a is lowered. Subsequently, when the disk is conveyed to the position B, as indicated in FIG. 3C, the switch arm 40 is further rotated to turn on the switch B 41b. In this way the operation of the motor 26 is stopped and the conveyance of the disk 25 is terminated. 42 is a spring always energizing the switch arm 40, which pushes the switch A 41a to turn it on, in the state where the disk 25 is not in contact with the switch arm 40.

(4) CD Conveyance Termination Detecting Mechanism

Figure 4A:
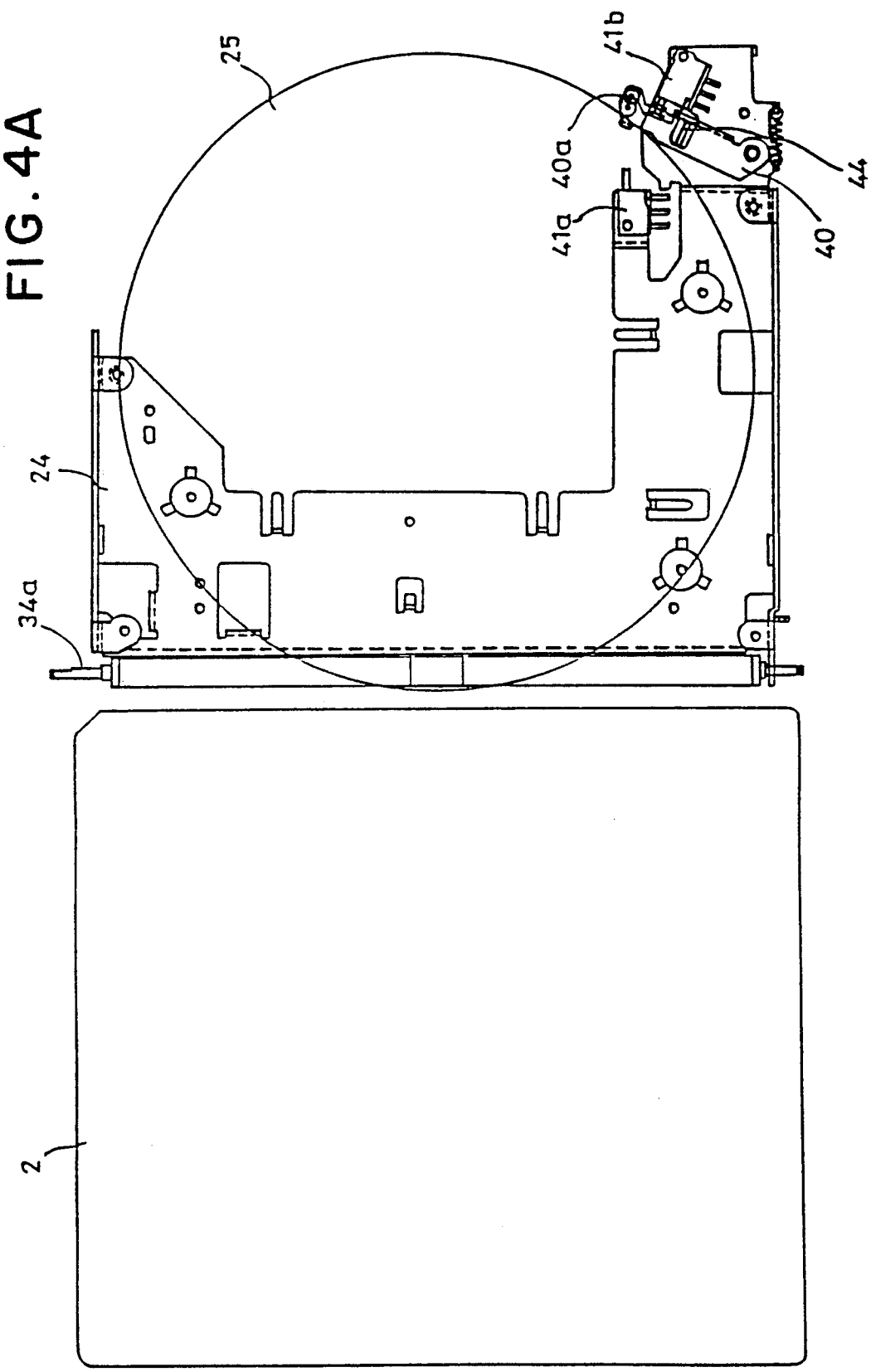

FIGS. 4A to 4C show a CD conveyance termination detecting mechanism, in which 24 is the lower plate; 44 is a protrusion disposed on a bottom plate 43; and 40b is a hole formed on the switch arm 40. When it is detected by the switch B 41b described previously, that the disk 25 has been conveyed to the predetermined position, the CD conveying mechanism including the lower plate 24 is lowered to the PLAY position by the CD selecting mechanism described previously and at the same time the protrusion 44 stated above is engaged with the hole 40b. Since the switch arm 40 is separated from the disk 25, the playback of the disk 25 is possible. FIG. 4C shows this state. The protrusion 44 works so as to rotate the switch arm 40 by using a taper 44a in the release direction. In this way it is detected that the disk load plate 32 is at the predetermined position.

(5) CD Chucking Mechanism

Figure 5A:
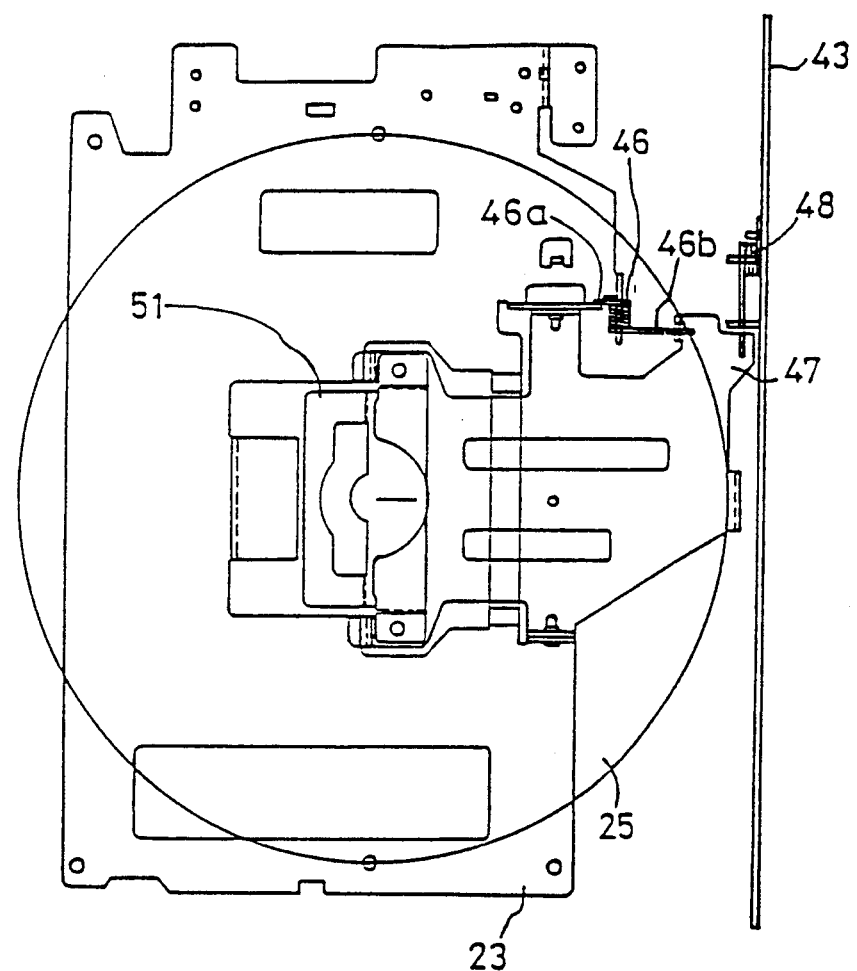
FIGS. 5A, 5B, 5C and 5D are a top view, a front view and a side view, respectively, showing a CD chucking mechanism incorporated in the CD player for car use.
Figure 5B:
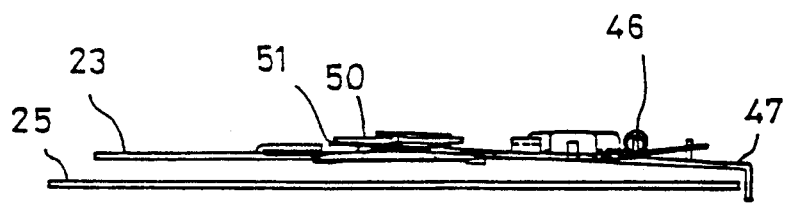
Figure 5C:
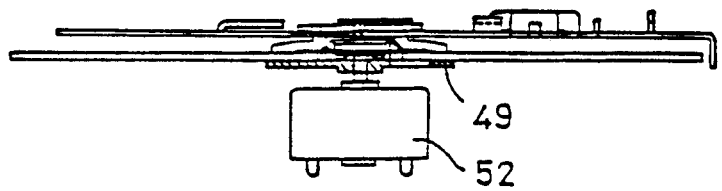
Figure 5D:
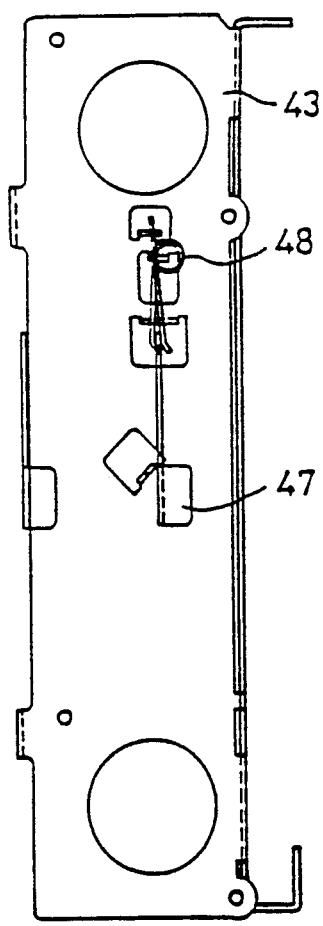

FIGS. 5A to 5D show a CD chucking mechanism, in which 46 is a spring A, which energizes a clamp arm 47 in one direction (downward) by an extremity thereof 46b by the fact that the other extremity thereof 46 is brought into contact with the upper plate 23. Further a spring 48 is disposed on the side surface of the bottom plate 43. When the disk is lowered to the PLAY position through the CD conveying mechanism by the CD selecting mechanism described previously, this spring 48 is brought into contact with the clamp arm 47. It is so constructed that it rotates the clamp arm 47 by the spring force thereof and clamps the disk, which has been landed on a turntable 49, through a disk clamp 50. The disk clamp 50 is held by a clamp holder 51 and the turntable 49 is driven by a motor 52. FIG. 5B shows the state before the disk 25 is clamped and FIG. 5C the state after the disk 25 has been clamped.

(6) CD Magazine Ejecting Mechanism

Figure 6A:
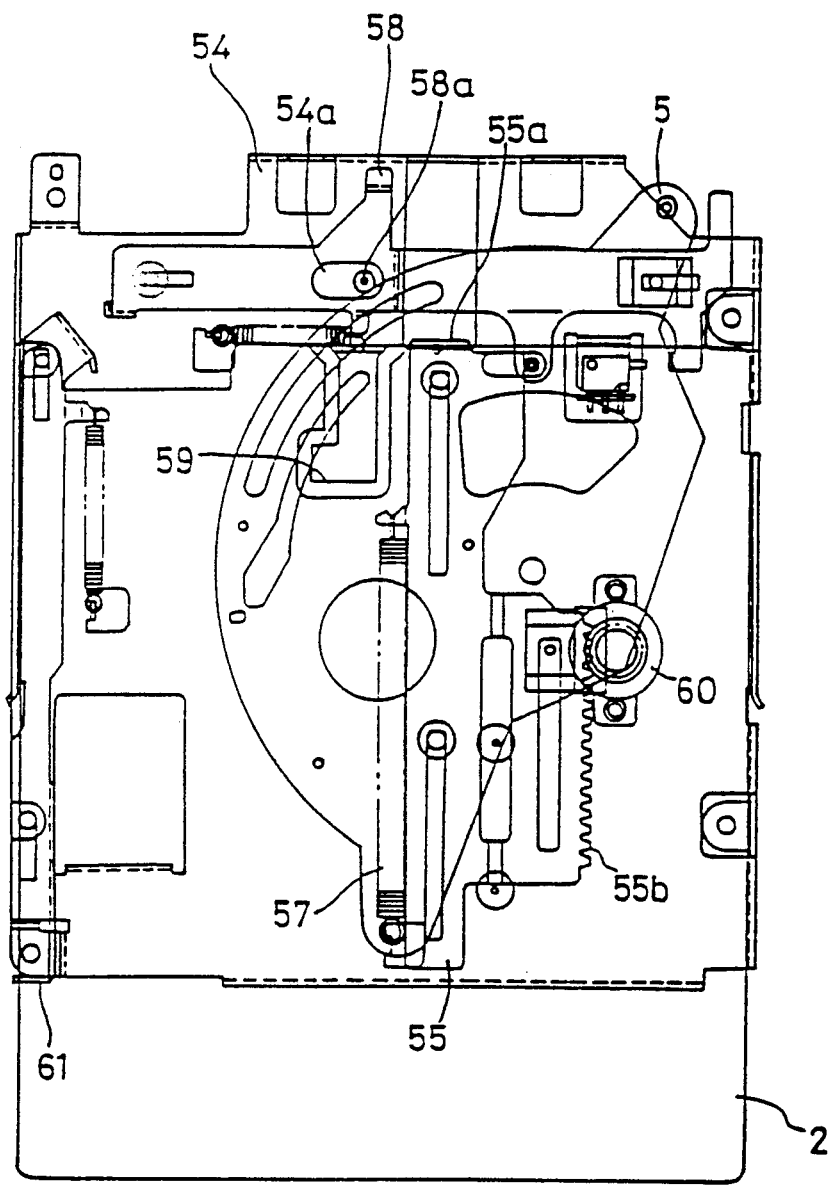
FIGS. 6A to 6C and FIGS. 7A to 7C are top views showing an automatic magazine ejecting mechanism and a manual magazine ejecting mechanism, respectively, incorporated in the CD player for car use.
Figure 6B:
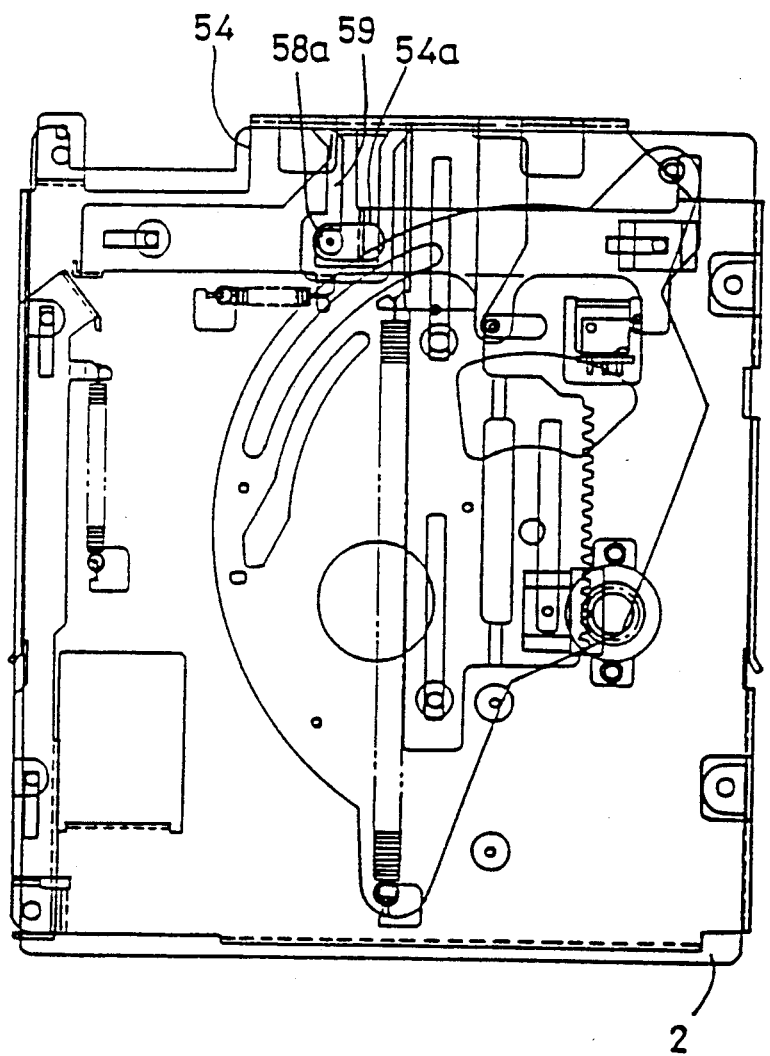
Figure 6C:
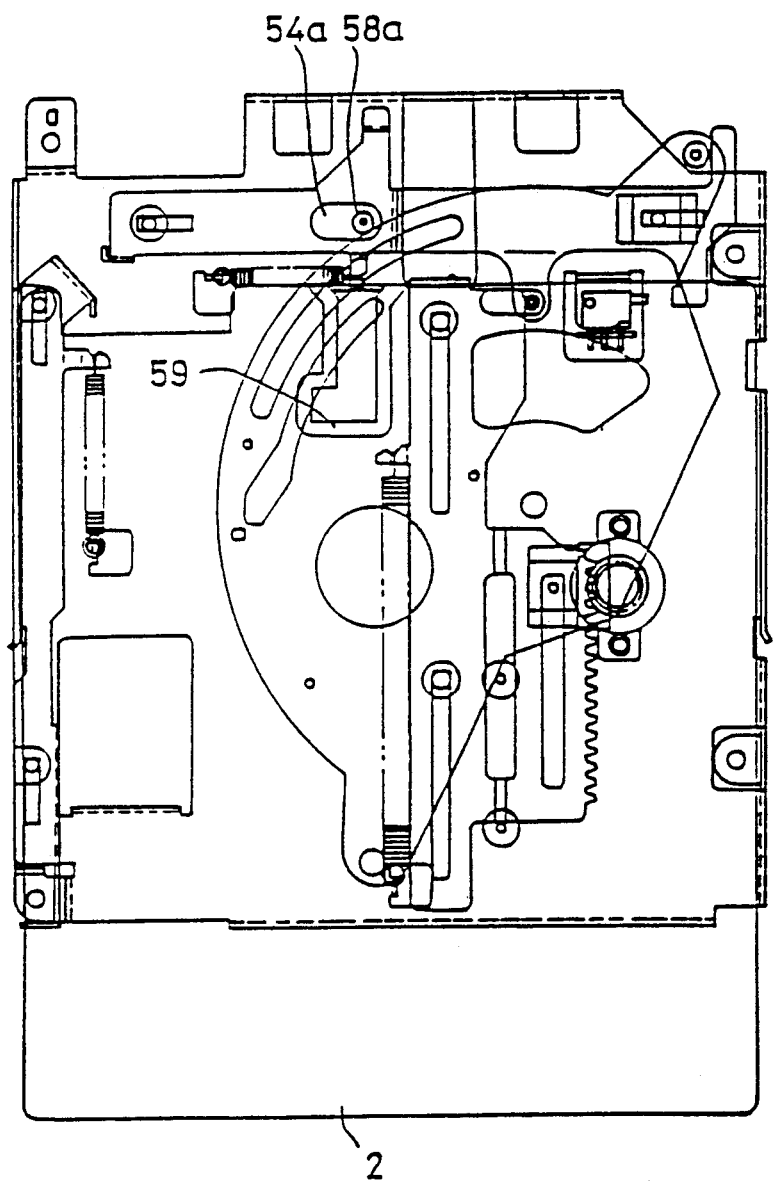
Figure 7A:
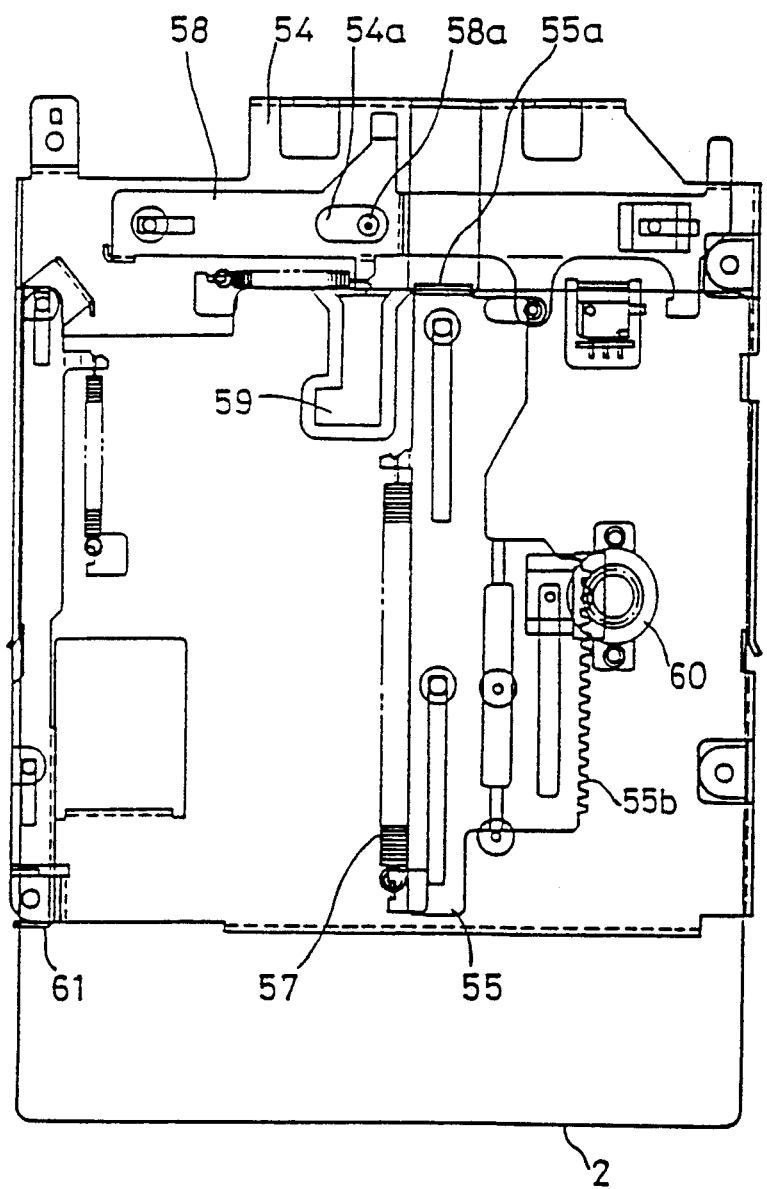
Figure 7B:
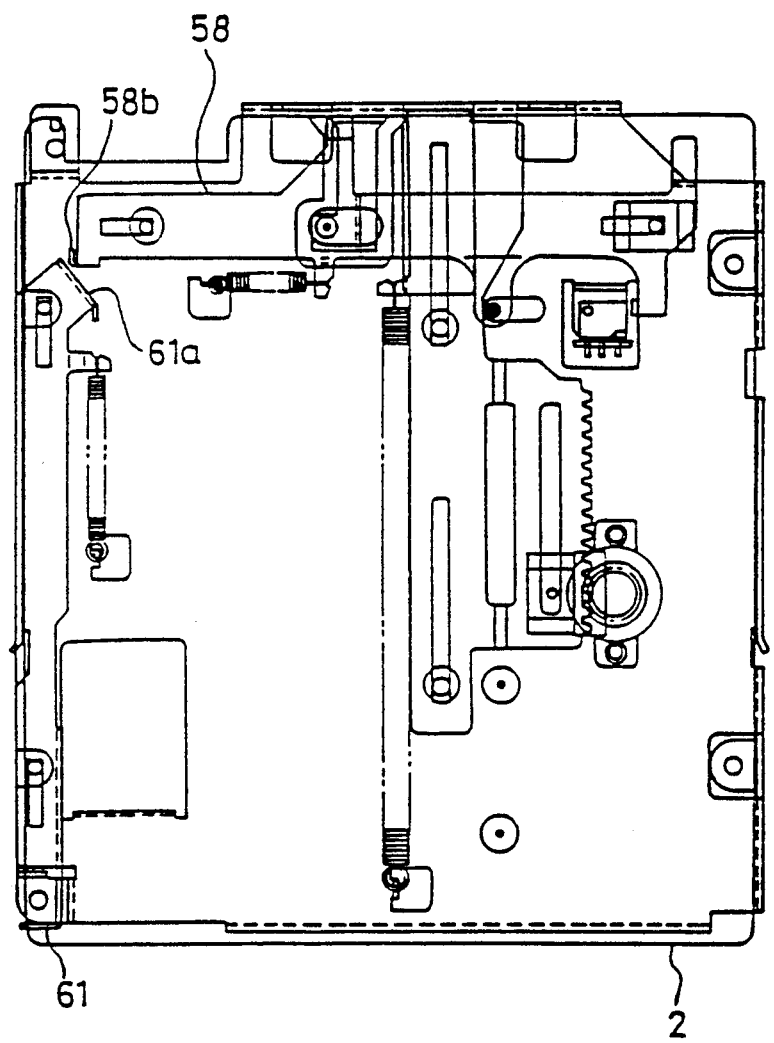
Figure 7C:
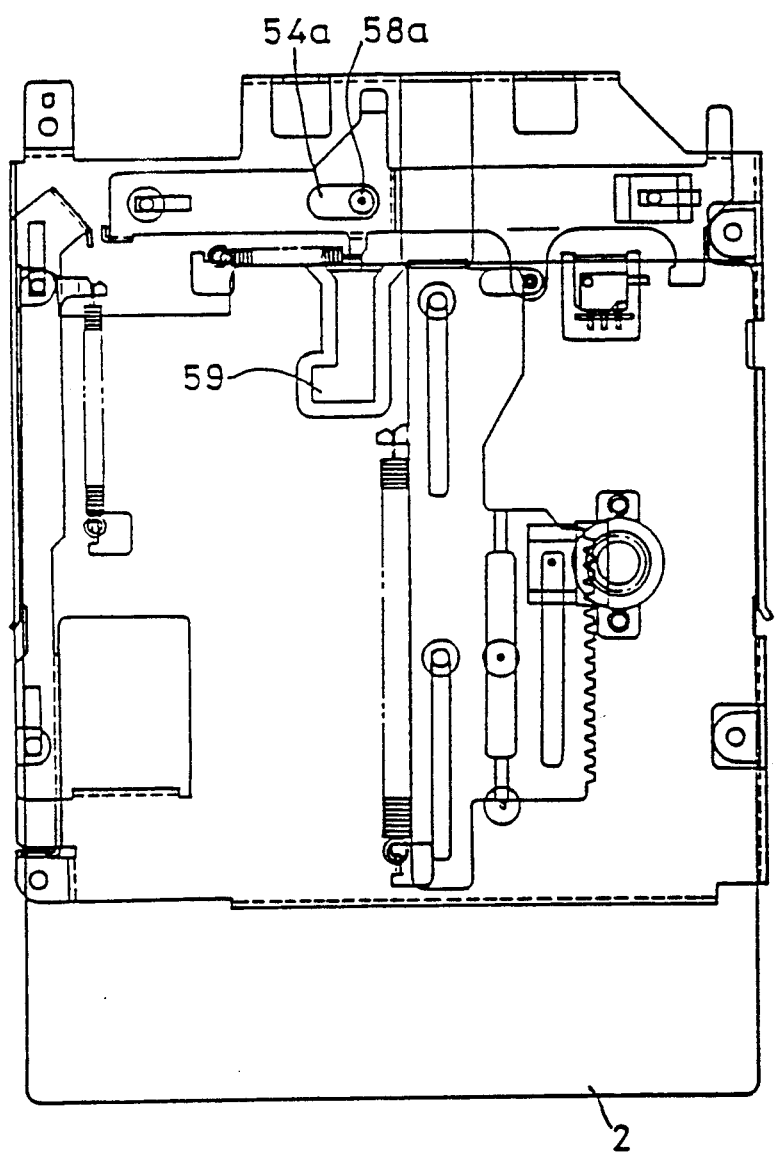

FIGS. 6A to 6C show an automatic ejecting mechanism and FIGS. 7A to 7C a manual ejecting mechanism. The magazine 2 is inserted as indicated in FIGS. 6A and 7A. 54 is a magazine plate, which is brought into contact with the magazine 2 to guide it. 55 is an eject plate disposed on the rear surface of a magazine plate 54, with which a stopping portion 55a is engaged, when the magazine is inserted. This eject plate is always energized downward by a spring and pushed up by the inserted magazine. 58 is a lock plate, which is engaged with the eject plate 55 and can be moved in the left and right direction. This lock plate 58 has a roller 58a. This roller 58a protrudes through a guiding hole 54a formed in the magazine plate 54 and can be locked by a locking groove 59 disposed on the rear surface of the magazine 2. This roller 58a is moved in the left and right direction by the edge portion of the slide link 5. 60 is a damper gear, which is engaged with the gear portion of the eject plate 55, acting so as to smoothen the movement of the eject plate 55. 61 is an eject lever used for manual ejection.

The roller 58a of the lock plate 58 is inserted in the lock groove 59 in the magazine 2 by pushing upward the magazine 2 on the magazine plate 54 to insert it, when the slide link 5 is at a rotational position other than the EJECT position, as indicated in FIG. 6A, and it is locked there, as indicated in FIG. 6B. Subsequently, when the slide link 5 is at the rotational position, which is the EJECT position, the engagement of the roller 58a with the lock groove 59 is released, as indicated in FIG. 6C, and the magazine 2 is automatically ejected by being energized downward by the stopping portion 55a of the eject plate 55.

In the case of the manual operation, the engagement of the roller 58a with the lock groove 59 is released, because the end portion 58b of the lock plate 58 is pushed to the right by the protruding portion 61a of the eject lever 61, as indicated in FIG. 7B, and in this way the magazine 2 is ejected, as indicated in FIG. 7C. In this case of the manual operation the magazine 2 can be ejected freely at any position.

Next, the operation of the CD selecting mechanism in the embodiment of the present invention will be explained, referring to FIG. 1A(a) to 1A(c) to FIGS. 1D(a) to 1D(c). The slide link 5 is rotated in the clockwise direction X or in the counterclockwise direction Y by transmitting the rotation of the motor 1 to the slide gear 7 and the first slide plate 19 and the second plate 20 are moved in the horizontal directions different from each other. In this way the CD conveying mechanism consisting of the upper plate 23 and, the lower plate 24 is moved intermittently in the upward and downward direction by the stepwise cams 21A, 21B and 22 disposed on the first and the second slide plate 19 and 20, respectively.

The position detection by the CD conveying mechanism is effected by detecting the plurality of position detecting holes 9 formed in the slide gear 5 by means of the photointerrupter 17. It is effected further by detecting the thrusting state of the switch 15 by the cam groove 11 in the slide link 5. In this way the detection is always precise by effecting the position detection by means of both the detecting means. For example, only by the detecting means using the position detecting holes 9, when the operation is stopped in the midway by the switching-off of the power supply, etc., it can be impossible to know where the position detecting holes are. In this case the precise position can be detected by setting the initial position by using the switch 15.

Further, since the CD conveying mechanism can be smoothly intermittently moved by using cycloid curves for the shape of the stepwise cams disposed on the first and the second slide plate 19 and 20, it is possible to reduce vibration and noise.

As described above, by the embodiment of the present invention, since the effects described below can be obtained, it is possible to remove the drawbacks of the prior art technique.

1. Since a CD is selected from the magazine by intermittently moving the conveying mechanism, using the stepwise cams, the precision of the selected position is improved.
2. Since the selecting operation is effected by combining the cams and the gears, the operation speed is high.
3. Since no high precision is required for the positioning of parts, mounting efficiency is raised.
4. Since the position detection is effected by using a small number of detecting elements, it is possible to try to reduce the cost.

Although in the embodiment in the text explanation has been made by using two kinds of slide plates, the present invention is not limited thereto.

FIG. 9 shows another construction of the CD selecting mechanism, in which the same reference numerals represent the items identical or corresponding to those indicated in FIG. 1A(a) to 1A(c) to FIGS. 1D(a) to 1D(c). In FIG. 9, a plurality of recess portions 11A corresponding to the disk selecting positions are disposed in the groove cam 11 formed in the slide gear 7. The axle 14 of the switch plate 13, which is energized in one direction by the switch plate spring 20S, is engaged with the groove cam 11 and at the same time the extremity portion 13A of the switch plate 13 is brought into contact with the thrusting piece 15A of the switch 15 for detecting the specified position of one of the disk selecting positions.

In this way, since the axle 14 is engaged with the groove cam 11 formed in the slide gear 7 by the fact that the switch plate 13 is always energized by the switch plate spring 20S, it is possible to prevent erroneous operation due to the fact that the axle 14 of the switch plate 13 gets out of the correct recess portion 11A in the groove cam 11 by backlash of the gear, in the case where vibration is applied thereto. The selection of the disk is effected by detecting the position detecting hole 9 of the slide gear 7 by means of the photointerrupter 17.

According to the embodiment indicated in FIG. 9, since the axle 14 of the switch plate 13, which is energized in one direction by switch plate spring 20S, is engaged with a plurality of recess portions 11A disposed in the groove cam 11, corresponding to the disk selecting positions, it is possible to prevent the slide gear 7 from being moved by backlash of the gear, when vibration is applied thereto, so that the position detecting hole 9 gets out of the detection domain of the photointerrupter 17, which gives rise to an erroneous operation.

As described above, according to the present invention, since, the selecting operation is effected by horizontally moving the slide plate by means of the slide link so that the conveying mechanism is moved intermittently in the upward and downward direction, it is possible to effect the position detection with a high precision.

What is claimed is:

1. A disk selecting mechanism, comprising: a driving gear, which rotates both in a forward direction and in a backward direction; a slide gear engaged with said driving gear; position detecting means for detecting a plurality of positions; a slide link, with which said slide gear is disposed together as one body, and in which said position detecting means is disposed; switching means operated by said position detecting means; a slide plate, on which said position detecting means is disposed; switching means operated by said position detecting means; a slide plate, on which a stepwise cam portion is formed and which is moved by said slide link; and a disk conveying portion engaged with said stepwise cam portion and moved upward and downward; wherein there are disposed two groups of said position detecting means and said switching means, the position detection being effected by combining said groups; and wherein one of said groups includes a plurality of position detecting holes and a photocoupler detecting them, and the other of said groups includes a groove cam and a switch operated by said cam.

* * * * *

UNITED STATES PATENT AND TRADEMARK OFFICE
CERTIFICATE OF CORRECTION

PATENT NO. : 5,276,668

DATED : January 4, 1994

INVENTOR(S) : Shigeo KINOSHITA et al

It is certified that error appears in the above-identified patent and that said Letters Patent is hereby corrected as shown below:

```
Column  8, lines 34-35; delete in their entirety.
           line   36; delete "means; a slide plate,".
```

Signed and Sealed this

Twenty-fourth Day of May, 1994

*Attest:*

BRUCE LEHMAN

*Attesting Officer*  *Commissioner of Patents and Trademarks*